United States Patent
Ortmann et al.

(10) Patent No.: US 10,910,614 B2
(45) Date of Patent: Feb. 2, 2021

(54) ELECTRIFIED VEHICLES EQUIPPED WITH SECONDARY BATTERY PACKS

(71) Applicant: FORD GLOBAL TECHNOLOGIES, LLC, Dearborn, MI (US)

(72) Inventors: Walter Joseph Ortmann, Saline, MI (US); Thomas J. Coupar, Ann Arbor, MI (US); Kenneth James Miller, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/934,053

(22) Filed: Mar. 23, 2018

(65) Prior Publication Data

US 2019/0296295 A1    Sep. 26, 2019

(51) Int. Cl.
| | | |
|---|---|---|
| *B60L 53/14* | (2019.01) | |
| *H01M 2/10* | (2006.01) | |
| *H01M 10/04* | (2006.01) | |
| *B60L 50/15* | (2019.01) | |
| *B60W 10/26* | (2006.01) | |

(52) U.S. Cl.
CPC ........... *H01M 2/1083* (2013.01); *B60L 53/14* (2019.02); *H01M 10/04* (2013.01); *B60L 50/15* (2019.02); *B60W 10/26* (2013.01)

(58) Field of Classification Search
CPC .... B60K 2001/0416; B60K 2001/0444; B60L 50/15; B60L 50/50; B60W 10/26
USPC .............................................. 180/68.5, 65.29
See application file for complete search history.

(56) References Cited

U.S. PATENT DOCUMENTS

| | | | | |
|---|---|---|---|---|
| 4,042,054 A | * | 8/1977 | Ward | B60K 1/04 180/60 |
| 4,543,798 A | * | 10/1985 | Page | B60N 3/103 220/524 |
| 5,727,835 A | * | 3/1998 | Krush | B60R 9/00 224/404 |
| 5,934,397 A | * | 8/1999 | Schaper | B60G 3/01 180/65.245 |
| 6,571,949 B2 | * | 6/2003 | Burrus, IV | B25H 3/02 206/373 |
| 6,596,941 B2 | * | 7/2003 | Tripoli | B60R 11/02 174/135 |
| 6,660,967 B2 | * | 12/2003 | Brofft | F02B 63/04 219/133 |
| 7,219,941 B1 | * | 5/2007 | San Paolo | B60R 9/00 224/404 |
| 8,013,567 B2 | * | 9/2011 | Windsor | H01M 2/1072 320/101 |
| 8,120,308 B2 | | 2/2012 | Ward | |
| 8,127,879 B2 | * | 3/2012 | Constans | B60G 7/02 180/65.1 |

(Continued)

*Primary Examiner* — Jeffrey J Restifo
(74) *Attorney, Agent, or Firm* — David B. Kelley; Carlson, Gaskey & Olds (57) ABSTRACT

This disclosure details electrified vehicles that are equipped with secondary battery packs for increasing the electric range of the vehicles. An exemplary electrified vehicle includes a cargo space, such as a truck bed, and a secondary battery pack positioned within the cargo space. The secondary battery pack is adapted to selectively supply power for propelling one or more vehicle drive wheels. In some embodiments, the secondary battery pack is shaped like, and therefore disguised as, a toolbox.

15 Claims, 5 Drawing Sheets

(56) References Cited

U.S. PATENT DOCUMENTS

| | | | | |
|---|---|---|---|---|
| 8,292,015 B2* | 10/2012 | O'Quinn | ............... | B60K 1/04 |
| | | | | 180/68.5 |
| 8,534,403 B2* | 9/2013 | Pursifull | ............... | B60K 15/07 |
| | | | | 180/314 |
| 8,973,691 B2* | 3/2015 | Morgan | ............... | B60K 1/00 |
| | | | | 180/68.5 |
| 9,162,654 B2* | 10/2015 | Moller | ............... | B60K 1/04 |
| 9,425,671 B1* | 8/2016 | Van Meveren | ............... | H02K 7/1861 |
| 9,573,452 B2* | 2/2017 | Agnew | ............... | B60K 1/00 |
| 9,656,540 B2* | 5/2017 | Held | ............... | B60K 1/04 |
| 9,809,127 B2* | 11/2017 | Duhaime | ............... | H01M 2/1077 |
| 9,956,860 B2* | 5/2018 | Tsuji | ............... | B60K 1/04 |
| 9,975,415 B2* | 5/2018 | Jansen | ............... | B60K 1/00 |
| 10,479,184 B2* | 11/2019 | Matheson | ............... | B60K 6/48 |
| 2008/0100258 A1* | 5/2008 | Ward | ............... | H01M 10/465 |
| | | | | 320/101 |
| 2016/0009232 A1* | 1/2016 | Budny | ............... | B60R 11/06 |
| | | | | 206/373 |
| 2016/0176312 A1 | 6/2016 | Duhaime et al. | | |
| 2019/0016231 A1 | 1/2019 | Scaringe et al. | | |

* cited by examiner

ELECTRIFIED VEHICLES EQUIPPED WITH SECONDARY BATTERY PACKS

TECHNICAL FIELD

This disclosure relates to electrified vehicle battery packs, and more particularly to a secondary battery pack that can be positioned within a vehicle cargo space for selectively supplying power for propelling one or more vehicle drive wheels.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The high voltage battery pack provides a limited amount of electric-only driving range. Some customers desire the ability to add additional electric-only range to their electrified vehicles.

SUMMARY

An electrified vehicle according to an exemplary aspect of the present disclosure includes, among other things, a drive wheel, a cargo space, and a secondary battery pack positioned within the cargo space and adapted to selectively supply power for propelling the drive wheel. The secondary battery pack is shaped like a toolbox.

In a further non-limiting embodiment of the foregoing electrified vehicle, the electrified vehicle is a pickup truck.

In a further non-limiting embodiment of either of the foregoing electrified vehicles, the cargo space is established by a truck bed of the pickup truck.

In a further non-limiting embodiment of any of the foregoing electrified vehicles, a bottom surface of the secondary battery pack is spaced a distance above a floor of the cargo space.

In a further non-limiting embodiment of any of the foregoing electrified vehicles, the secondary battery pack includes an enclosure that houses at least one battery array.

In a further non-limiting embodiment of any of the foregoing electrified vehicles, the enclosure houses a cargo space.

In a further non-limiting embodiment of any of the foregoing electrified vehicles, a connection system electrically connects the secondary battery pack to a high voltage bus of the electrified vehicle.

In a further non-limiting embodiment of any of the foregoing electrified vehicles, the connection system includes a vehicle-side connector and a battery-side connector.

In a further non-limiting embodiment of any of the foregoing electrified vehicles, the vehicle-side connector is recessed into a wall of the cargo space.

In a further non-limiting embodiment of any of the foregoing electrified vehicles, the vehicle-side connector includes a flexible plug that extends between a rear wall of a passenger cabin and a front wall of the cargo space.

In a further non-limiting embodiment of any of the foregoing electrified vehicles, the vehicle-side connector is a female connector and the battery-side connector is a male connector.

In a further non-limiting embodiment of any of the foregoing electrified vehicles, the vehicle-side connector is a male connector and the battery-side connector is a female connector.

In a further non-limiting embodiment of any of the foregoing electrified vehicles, the cargo space and the secondary battery pack include locating features for aligning the vehicle-side connector and the battery-side connector.

In a further non-limiting embodiment of any of the foregoing electrified vehicles, the cargo space includes a locating bracket and the secondary battery pack includes a locating feet receivable under the locating bracket.

In a further non-limiting embodiment of any of the foregoing electrified vehicles, a primary battery pack is adapted to selectively supply power for propelling the drive wheel.

A method according to another exemplary aspect of the present disclosure includes, among other things, positioning a secondary battery pack within a cargo space of an electrified vehicle. The secondary battery pack is disguised as a toolbox and selectively propels a wheel of the electrified vehicle using power from the secondary battery pack.

In a further non-limiting embodiment of the foregoing method, the method selectively propels a wheel of the electrified vehicle using power from a primary battery pack of the electrified vehicle.

In a further non-limiting embodiment of either of the foregoing methods, the primary battery pack and the secondary battery pack provide the power in parallel.

In a further non-limiting embodiment of any of the foregoing methods, selectively propelling the wheel using power form the secondary battery pack is only performed when a state of charge of a primary battery pack of the electrified vehicle falls below a threshold level.

In a further non-limiting embodiment of any of the foregoing methods, positioning the secondary battery pack within the cargo space includes connecting a vehicle-side connector to a battery-side connector.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details electrified vehicles that are equipped with secondary battery packs for increasing the electric range of the vehicles. An exemplary electrified vehicle includes a cargo space, such as a truck bed, and a secondary battery pack positioned within the cargo space. The secondary battery pack is adapted to selectively supply power for propelling one or more vehicle drive wheels. In some embodiments, the secondary battery pack is shaped like, and therefore disguised as, a toolbox. These and other features are discussed in greater detail in the following paragraphs of this detailed description.

Figure 1:
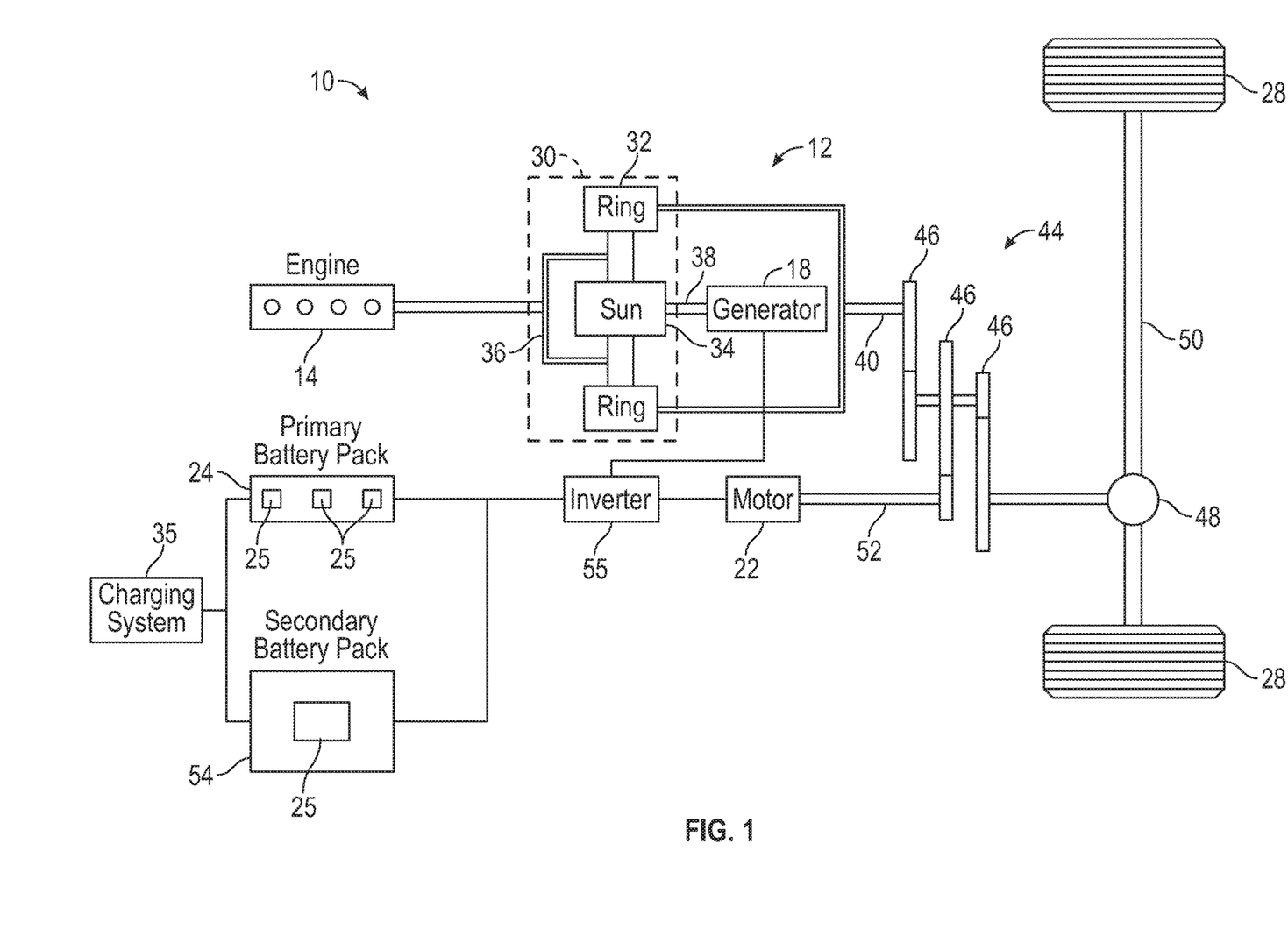
FIG. 1 schematically illustrates a powertrain of an electrified vehicle.

FIG. 1 schematically illustrates a powertrain 10 for an electrified vehicle 12. Although depicted as a plug-in hybrid electric vehicle (PHEV), it should be understood that the concepts described herein are not limited to PHEVs and could extend to other electrified vehicles, including, but not limited to, battery electric vehicles (BEVs), hybrid electric vehicles (HEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, a primary battery pack 24, and a secondary battery pack 54. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the primary battery pack 24.

The primary battery pack 24 is an exemplary electrified vehicle battery. The primary battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

The secondary battery pack 54 may be an additional high voltage traction battery provided on the electrified vehicle 12. The secondary battery pack 54 can be connected either in parallel or in series relative to the primary battery pack 24. Like the primary battery pack 24, the secondary battery pack 54 is capable of outputting electrical power for propelling the wheels 28. As discussed in greater detail below, the secondary battery pack 54 may include one or more battery arrays 25.

The primary battery pack 24, the secondary battery pack 54, and the generator 18 may be electrically connected over a high voltage bus through an inverter 55. The inverter 55, which may be an inverter system controller (ISC), supports bidirectional power flow within the powertrain 10 by converting direct current from the primary battery pack 24 and/or the secondary battery pack 54 to alternating current for powering the motor 22 or generator 18, or may alternatively convert alternating current from the motor 22 and/or generator 18 to direct current for charging the primary battery pack 24 and/or the secondary battery pack 54.

The electrified vehicle 12 may also be equipped with a charging system 35 for charging the energy storage devices (e.g., battery cells) of the primary battery pack 24 and the secondary battery pack 54. The charging system 35 may include charging components that are located both onboard the electrified vehicle 12 and external to the electrified vehicle 12. The charging system 30 can be connected to an external power source for receiving and distributing power received from the external power source throughout the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the primary battery pack 24 state of charge up to its maximum allowable discharging rate under certain driving patterns/cycles. The EV mode is an example of a charge depleting mode of operation for the electrified vehicle 12. During EV mode, the state of charge of the primary battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the primary battery pack 24 at a constant or approximately constant level by increasing the engine 14 propulsion. The electrified vehicle 12 may be operated in other operating modes in addition to the EV and HEV modes within the scope of this disclosure.

Figure 2:
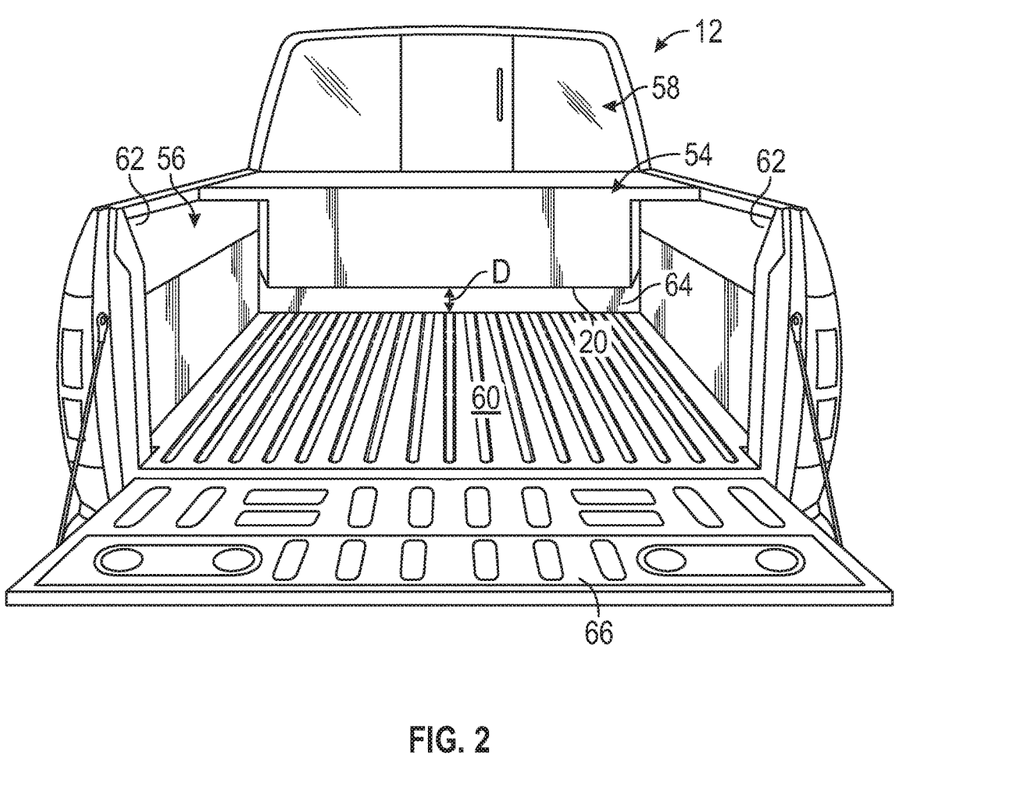
FIG. 2 illustrates an electrified vehicle that may employ the powertrain of FIG. 1.

FIG. 2 illustrates an electrified vehicle 12 that may employ the powertrain 10 shown in FIG. 1 or any other electrified or hybridized powertrain. In an embodiment, the electrified vehicle 12 is a pickup truck. Although a specific component relationship is illustrated in the figures of this disclosure, the illustrations are not intended to limit this disclosure. The placement and orientation of the various components of the electrified vehicle 12 are shown schematically and could vary within the scope of this disclosure. In addition, the various figures accompanying this disclosure are not necessarily to scale, and some features may be exaggerated or minimized to show certain details of a particular component.

The electrified vehicle 12 includes a truck bed 56 that establishes a cargo space for storing and hauling cargo at a rear location of the electrified vehicle 12. The truck bed 56 is generally rearward of a passenger cabin 58 of the electrified vehicle 12 and includes a floor 60 extending between a pair of longitudinally extending side walls 62, a laterally extending front wall 64, and a tailgate 66. The tailgate 66 is moveable between a closed position (not shown) and a deployed or open position. When in the closed position, the tailgate 66 generally encloses an end of the truck bed 56 that is opposite from the front wall 64 to prevent cargo from sliding out of the truck bed 56. When in the open position, the tailgate 66 is generally horizontal and thus parallel to ground level such that cargo can be loaded onto or unloaded from the truck bed 56.

The secondary battery pack 54 may be positioned within the truck bed 56, such as near the front wall 64. In an embodiment, the secondary battery pack 54 is shaped like, and therefore disguised as, a toolbox. Disguising the secondary battery pack 54 as a toolbox gives the customer the option to add additional electric range to the electrified vehicle 12 without sacrificing any more cargo space than would be taken up by a traditional saddle style truck bed toolbox.

In the installed position, at least a portion of a bottom surface 70 of the secondary battery pack 54 may be spaced a distance D above the floor 60 of the truck bed 56. Therefore, cargo may be slid underneath the secondary battery pack 54 even when the electrified vehicle 12 is equipped with the secondary battery pack 54.

Figure 3:
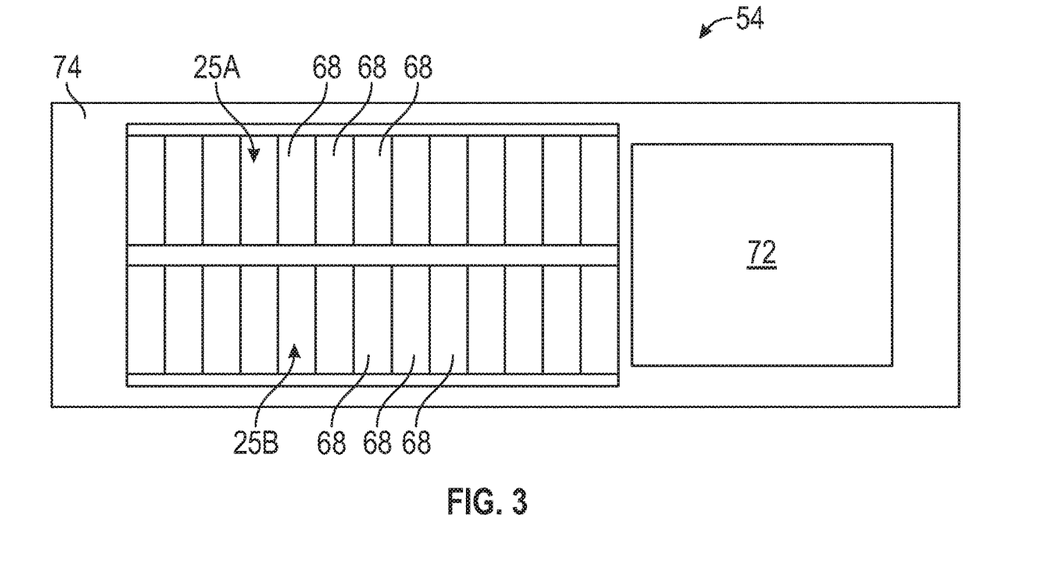
FIG. 3 illustrates a secondary battery pack of the electrified vehicle of FIG. 2.

FIG. 3 illustrates additional features of the exemplary secondary battery pack 54. FIG. 3 is a top, cross-sectional view of the secondary battery pack 54 for visualizing its internal contents.

The secondary battery pack 54 houses a plurality of battery cells 68 that store energy for powering various electrical loads of the electrified vehicle 12. The secondary battery pack 54 could employ any number of battery cells within the scope of this disclosure. Thus, this disclosure is not limited to the exact configuration shown in FIG. 3.

The battery cells 68 may be stacked side-by-side to construct a grouping of battery cells 68, sometimes referred to as a "cell stack" or "cell array." In an embodiment, the battery cells 68 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 68, along with any support structures (e.g., array frames, spacers, rails, walls, plates, bindings, etc.), may collectively be referred to as a battery array or battery assembly. The secondary battery pack 54 depicted in FIG. 3 includes a first battery array 25A and a second battery array 25B that is side-by-side with the first battery array 25A. Although the secondary battery pack 54 of FIG. 3 is depicted as having a two battery arrays, the secondary battery pack 54 could include a greater or fewer number of battery arrays and still fall within the scope of this disclosure.

In an embodiment, the first battery array 25A and the second battery array 25B are irremovable from the secondary battery pack 54. In another embodiment, the first battery array 25A and the second battery array 25B are modular battery array units that are removable from the secondary battery pack 54. In such a modular design, the customer can customize the secondary battery pack 54 to provide a desired amount of additional electric range. An exemplary modular secondary battery pack could include up to six battery arrays, for example. The modular battery arrays can be removed and charged or could be charged while mounted inside the secondary battery pack 54.

The secondary battery pack 54 may optionally include a cargo space 72. The cargo space 72 is an open area inside the secondary battery pack 54 that can be used for general storage purposes, such as for holding tools or other cargo. The size, shape, and location of the cargo space are not intended to limit this disclosure. For example, although shown beside the first battery array 25A and the second battery array 25B in FIG. 3, the cargo space 72 could be positioned between first battery array 25A and the second battery array 25B, or at any other location inside the secondary battery pack 54.

An enclosure 74 houses each battery array 25A, 25B and the cargo space 72 of the secondary battery pack 54. In an embodiment, the enclosure 74 is shaped like a toolbox in order to disguise the secondary battery pack 54 as the toolbox. In another embodiment, the enclosure 74 is constructed of a polymer-based material, a metallic material, or a combination of polymer-based and metallic materials. However, the actual size, shape, and material make-up of the enclosure 74 is not intended to limit this disclosure.

Figure 4:
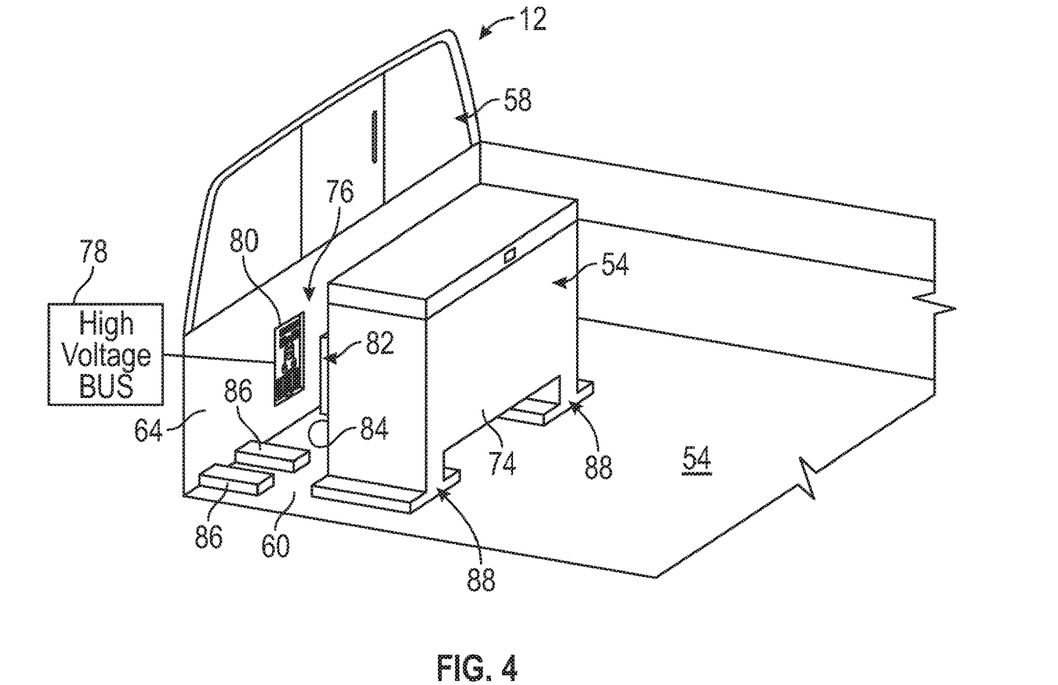
FIG. 4 illustrates a connection system for connecting a secondary battery pack to a high voltage bus of an electrified vehicle according to a first embodiment of this disclosure.

FIG. 4, with continued reference to FIGS. 1, 2, and 3, illustrates a connection system 76 for electrically connecting the secondary battery pack 54 to a high voltage bus 78 of the electrified vehicle 12. The connection system 76 may include a vehicle-side connector 80 and a battery-side connector 82. In an embodiment, the vehicle-side connector 80 is rigidly disposed within the front wall 64 of the truck bed 56 and the battery-side connector 82 is rigidly disposed in a rear wall 84 of the enclosure 74 of the secondary battery pack 54. In another embodiment, the vehicle-side connector 80 is a female connector and the battery-side connector 82 is a male connector. The battery-side connector 82 may be plugged into the vehicle-side connector 80 to connect the secondary battery pack 54 to the high voltage bus 78.

The connection system 76 may additionally include one or more locating features for aligning the battery-side connector 82 with the vehicle-side connector 80 as the secondary battery pack 54 is moved into position within the truck bed 56. In an embodiment, the connection system 76 includes locating brackets 86 that are mounted to the floor 60 of the truck bed 56 at a location near the front wall 64. Each locating bracket 86 may be generally L-shaped, for example. The enclosure 74 of the secondary battery pack 54 may include locating feet 88 positioned on opposite ends of the secondary battery pack 54. The locating feet 88 may be generally T-shaped, for example. The locating feet 88 may be slid underneath the locating brackets 86 to align the battery-side connector 82 with the vehicle-side connector 80. Therefore, as the secondary battery pack 54 is moved further toward the front wall 64, the battery-side connector 82 will be properly positioned for engaging the vehicle-side connector 80.

Figure 5A:
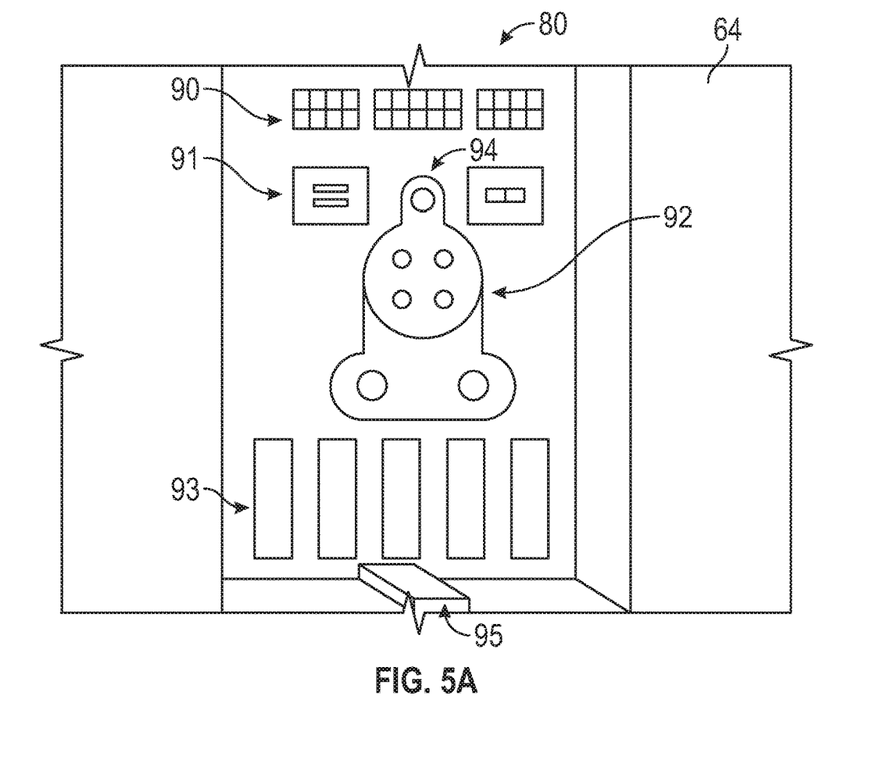
FIG. 5A illustrates a vehicle-side connector of the connection system of FIG. 4.

FIG. 5A illustrates the vehicle-side connector 80 of the connection system 76. The vehicle-side connector 80 may be slightly recessed into the front wall 64 of the truck bed 56 and may include low voltage connection ports 90, high voltage connection ports 91, and optionally, a fast charging connection port 92. Of course, the vehicle-side connector 80 could embody other configurations within the scope of this disclosure.

The high voltage connection ports 91 allow the secondary battery pack 54 to be connected with the primary battery pack 24, or directly to the electric motor 22. The low voltage connection ports 90 allow for CAN communication with a control module in the secondary battery pack 54 or for individual cell voltage and/or temperature readings to be passed to the primary battery pack 24 controller. Any other non-high voltage I/O decided upon for the system design can interface with the rest of the vehicle through the vehicle-side connector 80. The fast charging connection port 90 provides for fast charging the electrified vehicle 12 while the customer/user is using the secondary battery pack 54.

In another embodiment, the vehicle-side connector 80 includes cooling inlet ports 93 for air or liquid cooling the vehicle-side connector 80. The cooling inlet ports 93 may mate with the battery-side connector 82 for introducing a cooling fluid into the cooling inlet ports 93 for cooling the vehicle-side connector 80.

In yet another embodiment, the vehicle-side connector 80 includes a lock actuator 94. The lock actuator 94 is configured to prevent removal of the battery-side connector 82 from the vehicle-side connector 80 while the electrified vehicle 12 is operating (i.e., ignition is turned ON). The lock actuator 94 may also lock in the DC-Combo harness connector required to fast charge.

The vehicle-side connector 80 may additionally include a locating feature, such as a locating flange 95. The locating flange 95 may engage a corresponding locating feature, such as a locating recess, of the battery-side connector 82 as the secondary battery pack 54 is moved into position within the truck bed 56.

Figure 5B:
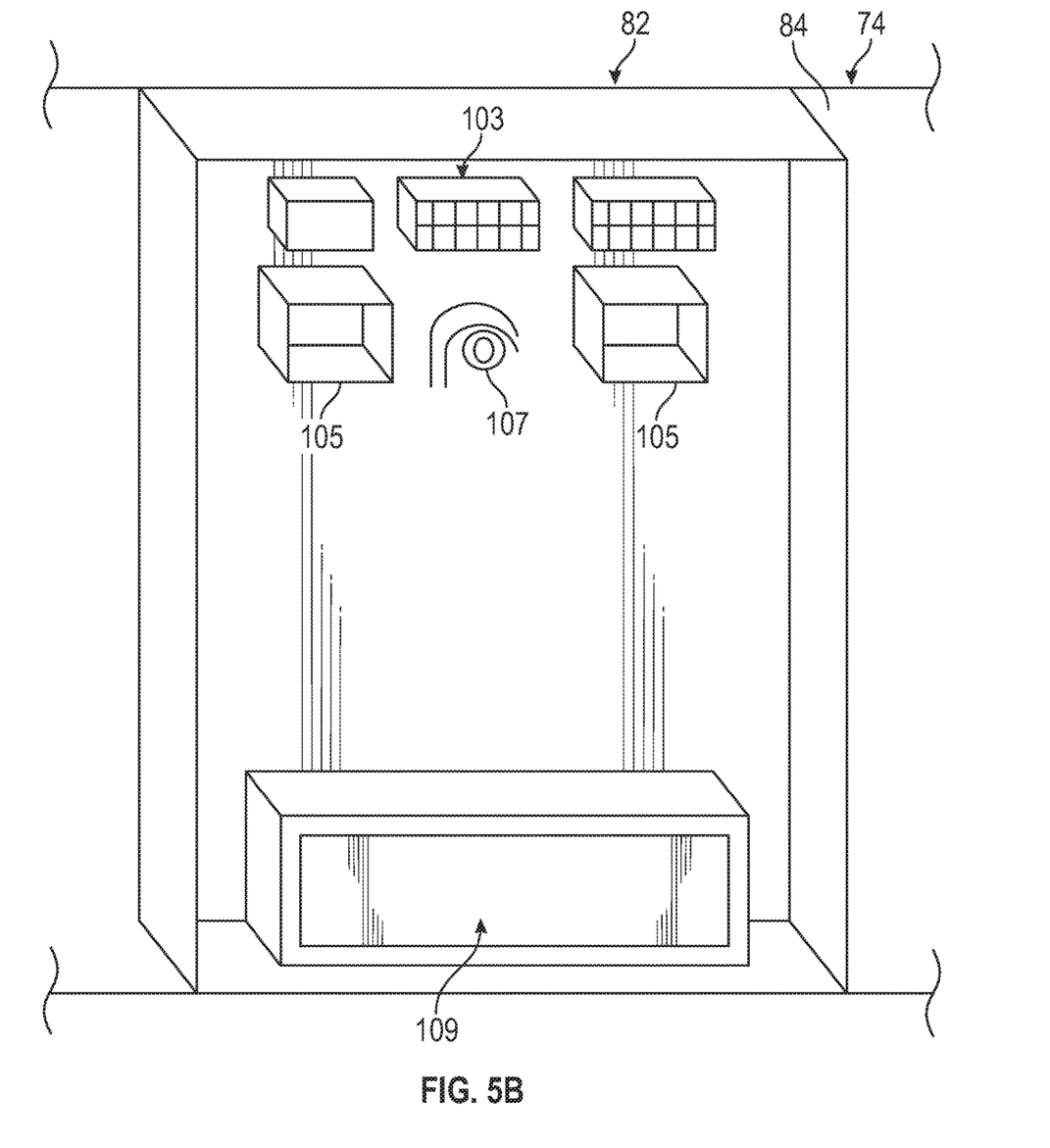
FIG. 5B illustrates a battery-side connector of the connection system of FIG. 4.

FIG. 5B illustrates the battery-side connector 82 of the connection system 76. The battery-side connector 82 may be slightly recessed into the rear wall 84 of the enclosure 74 of the secondary battery pack 54, although the connecting interfaces may protrude outwardly of the rear wall 84. The connection ports of the battery-side connector 82 may generally mirror those of the vehicle-side connector 80 and may include low voltage connection ports 103, high voltage connection ports 105, a lock actuator 107, and a fan cooling path 109. Of course, the battery-side connector 82 could embody other configurations within the scope of this disclosure.

Figure 6:
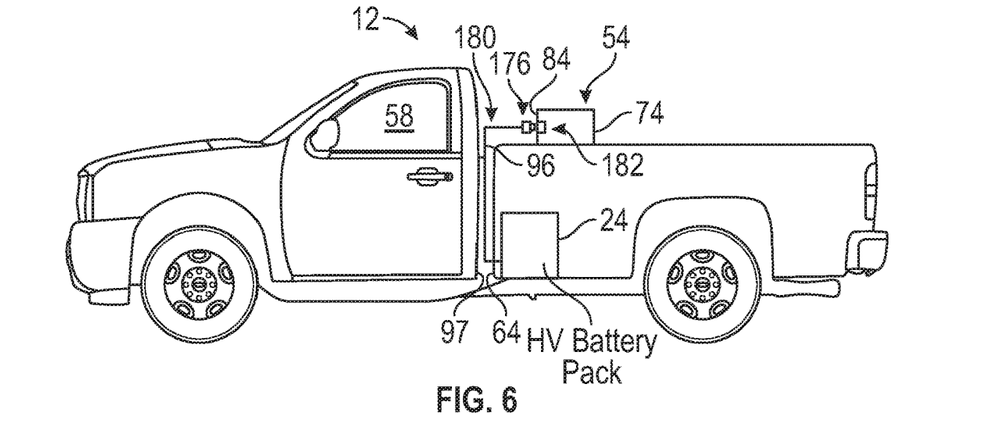
FIG. 6 illustrates a connection system for connecting a secondary battery pack to a high voltage bus of an electrified vehicle according to a second embodiment of this disclosure.

FIG. 6, with continued reference to FIGS. 1-3, illustrates another exemplary connection system 176 for electrically connecting the secondary battery pack 54 to the high voltage bus 78 of the electrified vehicle 12. The connection system 176 may include a vehicle-side connector 180 and a battery-side connector 182. In an embodiment, the vehicle-side connector 180 includes a flexible plug 96 that can be routed between a rear wall 97 of the passenger cabin 58 and the front wall 64 of the truck bed 56, and the battery-side connector 182 is a fixed connector that is recessed within the rear wall 84 of the enclosure 74 of the secondary battery pack 54. In this embodiment, the vehicle-side connector 180 is a male connector and the battery-side connector 182 is a female connector. The vehicle-side connector 180 may be plugged into the battery-side connector 182 to connect the secondary battery pack 54 to the high voltage bus 78.

The primary battery pack 24 and the secondary battery pack 54 can be controlled such that both packs output power for powering the motor 22 of the electrified vehicle 12. The motor 22 outputs torque for propelling the one or more drive wheels 28 of the electrified vehicle 12. The motor 22 may be mounted on an axle 23, which may be a front axle, rear axle, or both.

Figure 7:
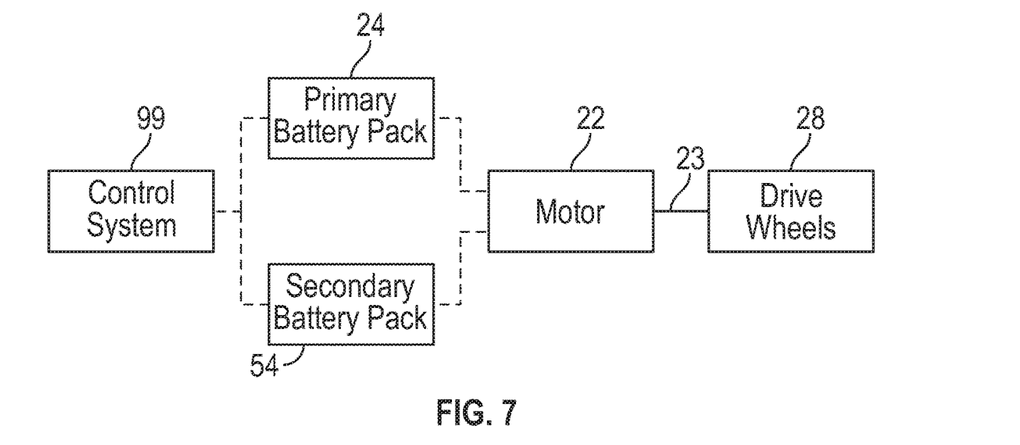
FIG. 7 illustrates an electric drive system according to a first embodiment of this disclosure.

As shown in FIG. 7, the primary battery pack 24 and the secondary battery pack 54 can be controlled by a control system 99 to provide power to the motor 22 in parallel. The control system 99 includes electronics, software, or both, for performing the necessary control functions for outputting power from the primary battery pack 24 and/or the secondary battery pack 54. Although shown as a single hardware device, the control system 99 could include multiple controllers in the form of multiple hardware devices, or multiple software controllers within one or more hardware devices. In an embodiment, the control system 99 is programmed to control how much power is outputted by each of the primary battery pack 24 and the secondary battery pack 54 during electric-only operating modes of the electrified vehicle 12.

Figure 8:
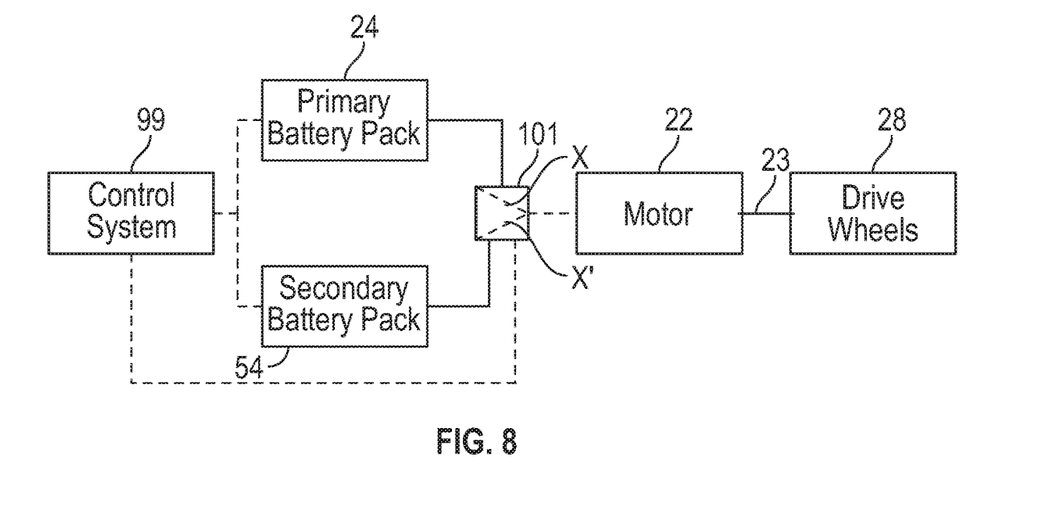
FIG. 8 illustrates an electric drive system according to a second embodiment of this disclosure.

In another embodiment, shown in FIG. 8, the control system 99 controls operation of a switch 101 for providing power from either the primary battery pack 24 or the secondary battery pack 54. For example, the control system 99 may command the switch 101 to a first positon X when power from only the primary battery pack 24 is desired, or to a second position X' when power from the secondary battery pack 54 is desired. In an embodiment, the control system 99 automatically commands the switch 101 to the second position X' when the state of charge of the primary battery pack 24 falls below a predefined threshold.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
a drive wheel;
an electric machine configured to output a torque for propelling the drive wheel;
a primary high voltage traction battery pack adapted to selectively supply power to the electric machine for propelling the drive wheel;
a cargo space; and
a secondary high voltage traction battery pack positioned within the cargo space and adapted to selectively supply power to the electric machine for propelling the drive wheel;
wherein the secondary high voltage traction battery pack is shaped like a toolbox,
wherein the primary high voltage traction battery pack and the secondary high voltage traction battery pack are electrically connected over a high voltage bus through an inverter.

2. The electrified vehicle as recited in claim 1, wherein the electrified vehicle is a pickup truck, and further wherein the cargo space is established by a truck bed of the pickup truck.

3. The electrified vehicle as recited in claim 1, wherein a bottom surface of the secondary high voltage traction battery pack is spaced a distance above a floor of the cargo space.

4. The electrified vehicle as recited in claim 1, wherein the secondary high voltage traction battery pack includes an enclosure that houses at least one battery array, and further wherein the enclosure houses a cargo space.

5. The electrified vehicle as recited in claim 1, comprising a connection system for electrically connecting the secondary high voltage traction battery pack to a high voltage bus of the electrified vehicle.

6. The electrified vehicle as recited in claim 5, wherein the cargo space and the secondary high voltage traction battery pack include locating features for aligning the vehicle-side connector and the battery-side connector.

7. The electrified vehicle as recited in claim 6, wherein the cargo space includes a locating bracket and the secondary high voltage traction battery pack includes a locating foot receivable under the locating bracket.

8. The electrified vehicle as recited in claim 1, wherein the secondary high voltage traction battery pack is received against a front wall of the cargo space and extends from a first longitudinally extending side wall to a second longitudinally extending side wall of the cargo space.

9. The electrified vehicle as recited in claim 1, wherein the toolbox is a saddle style truck bed toolbox.

10. An electrified vehicle, comprising:
a drive wheel;
an electric machine configured to output a torque for propelling the drive wheel;
a primary high voltage traction battery pack adapted to selectively supply power to the electric machine for propelling the drive wheel;
a cargo space;
a secondary high voltage traction battery pack positioned within the cargo space and adapted to selectively supply power to the electric machine for propelling the drive wheel,
wherein the secondary high voltage traction battery pack is shaped like a toolbox; and
a connection system for electrically connecting the secondary high voltage traction battery pack to a high voltage bus of the electrified vehicle,
wherein the connection system includes a vehicle-side connector and a battery-side connector.

11. The electrified vehicle as recited in claim 10, wherein the vehicle-side connector is recessed into a wall of the cargo space.

12. The electrified vehicle as recited in claim 10, wherein the vehicle-side connector includes a flexible plug that extends between a rear wall of a passenger cabin and a front wall of the cargo space.

13. The electrified vehicle as recited in claim 10, wherein the vehicle-side connector is a female connector and the battery-side connector is a male connector.

14. The electrified vehicle as recited in claim 10, wherein the vehicle-side connector is a male connector and the battery-side connector is a female connector.

15. An electrified vehicle, comprising:
a drive wheel;
an electric machine configured to output a torque for propelling the drive wheel;
a primary high voltage traction battery pack adapted to selectively supply power to the electric machine for propelling the drive wheel;
a cargo space;
a secondary high voltage traction battery pack positioned within the cargo space and adapted to selectively supply power to the electric machine for propelling the drive wheel,
wherein the secondary high voltage traction battery pack is shaped like a toolbox; and
a connection system for electrically connecting the secondary high voltage traction battery pack to a high voltage bus of the electrified vehicle,
wherein the connection system includes a high voltage connection port configured for connecting the secondary high voltage traction battery pack to the primary high voltage traction battery pack.

* * * * *